United States Patent
Heim et al.

(10) Patent No.: US 9,944,004 B2
(45) Date of Patent: Apr. 17, 2018

(54) TOOL FOR PRODUCING FIBER-REINFORCED PLASTICS COMPONENTS IN THE INJECTION PROCESS

(71) Applicant: Bayerische Motoren Werke Aktiengesellschaft, Munich (DE)

(72) Inventors: Bernhard Heim, Landshut (DE); Stefan Huber, Bodenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 16 days.

(21) Appl. No.: 14/925,009

(22) Filed: Oct. 28, 2015

(65) Prior Publication Data
US 2016/0046053 A1 Feb. 18, 2016

Related U.S. Application Data

(63) Continuation of application No. PCT/EP2014/065086, filed on Jul. 15, 2014.

(30) Foreign Application Priority Data

Aug. 1, 2013 (DE) .......... 10 2013 215 113

(51) Int. Cl.
| | |
|---|---|
| *B29C 45/26* | (2006.01) |
| *B29C 33/00* | (2006.01) |
| *B29C 45/00* | (2006.01) |
| *B29C 45/37* | (2006.01) |
| B29C 70/48 | (2006.01) |

(52) U.S. Cl.
CPC ...... *B29C 45/2608* (2013.01); *B29C 33/0038* (2013.01); *B29C 45/0005* (2013.01); *B29C 45/37* (2013.01); *B29C 70/48* (2013.01); *B29K 2823/16* (2013.01); *B29K 2827/00* (2013.01); (Continued)

(58) Field of Classification Search
CPC .................. B29C 45/2608; B29C 33/0038
See application file for complete search history.

(56) References Cited

U.S. PATENT DOCUMENTS

| | | | |
|---|---|---|---|
| 3,660,192 A | 5/1972 | Smith et al. | |
| 4,767,308 A * | 8/1988 | Adams ................ | B29C 33/0055 249/141 |

(Continued)

FOREIGN PATENT DOCUMENTS

| | | | |
|---|---|---|---|
| DE | 2937605 A1 * | 3/1981 | ......... B29C 33/0038 |
| DE | 295 11 641 U1 | 9/1995 | |

(Continued)

OTHER PUBLICATIONS

Partial machine translation of DE2937605A1 dated Mar. 1981 obtained from the espace website.*

(Continued)

*Primary Examiner* — Robert B Davis
(74) *Attorney, Agent, or Firm* — Crowell & Moring LLP

(57) ABSTRACT

A tool for producing fiber-reinforced plastics components in the injection process has a receptacle for a plastics component, which receptacle is surrounded by a circumferential seal which is inserted into a groove formed in the tool. It order to devise such a tool with which a higher service life for the seal can be achieved, the invention provides a receptacle chamber as volume compensation.

19 Claims, 4 Drawing Sheets

(52) U.S. Cl.
CPC ...... *B29K 2827/18* (2013.01); *B29K 2883/00* (2013.01); *B29K 2995/0077* (2013.01)

(56) References Cited

U.S. PATENT DOCUMENTS

| | | | |
|---|---|---|---|
| 7,108,824 | B1 | 9/2006 | Lafata et al. |
| 8,202,074 | B2 * | 6/2012 | Toda ................ B29C 37/0028 264/255 |
| 2011/0062613 | A1 | 3/2011 | Haraguchi et al. |

FOREIGN PATENT DOCUMENTS

| | | |
|---|---|---|
| DE | 101 35 724 B4 | 7/2005 |
| DE | 600 30 143 T2 | 7/2007 |
| DE | 10 2007 058 634 B4 | 6/2010 |
| DE | 10 2010 043 401 A1 | 5/2012 |
| JP | 59-129136 A | 7/1984 |
| JP | 62-185015 U | 11/1987 |
| JP | 2-144410 U | 12/1990 |
| JP | 5-177658 A | 7/1993 |
| JP | 7-186199 A | 7/1995 |
| JP | 2005-199634 A | 7/2005 |
| JP | 2009-285943 A | 12/2009 |
| JP | 2011-218643 A | 11/2011 |
| JP | 2012-187923 A | 10/2012 |

OTHER PUBLICATIONS

Chinese Office Action issued in counterpart Chinese Application No. 201480032031.3 dated Jul. 28, 2016, with English translation (fourteen (14) pages).

International Search Report (PCT/ISA/210) issued in PCT Application No. PCT/EP2014/065086 dated Oct. 17, 2014 with English-language translation (six (6) pages).

German Search Report issued in counterpart German Application No. DE 10 2013 215 113.6 dated Oct. 23, 2013 with partial English-language translation (ten (10) pages).

* cited by examiner

TOOL FOR PRODUCING FIBER-REINFORCED PLASTICS COMPONENTS IN THE INJECTION PROCESS

CROSS REFERENCE TO RELATED APPLICATIONS

This application is a continuation of PCT International Application No. PCT/EP2014/065086, filed Jul. 15, 2014, which claims priority under 35 U.S.C. § 119 from German Patent Application No. 10 2013 215 113.6, filed Aug. 1, 2013, the entire disclosures of which are herein expressly incorporated by reference.

BACKGROUND AND SUMMARY OF THE INVENTION

The invention relates to a tool for producing fiber-reinforced plastics components in an injection process, having a receptacle for a plastics component, which is surrounded by a circumferential seal that is inserted into a groove configured in the tool.

In order to produce fiber-reinforced plastics components in an injection process, tools having two shells are most often used. In order for the receptacle for the plastics component, which is located in the tool, to be sealed, an elastomer seal is employed. Injection material is filled into the receptacle during production of the plastics component. On account of volume compensation, this injection material is pressed against the seal and deforms the latter, which on account of the high temperature of the injection material and the stress on account of pressure leads to a short lifespan of the seal. This necessitates relatively frequent replacement of the seal. This in turn leads to significant material and set-up costs, and to a limited availability of the tool.

It is thus an object of the present invention to provide a tool for producing fiber-reinforced plastics components in the injection process, having a receptacle for a plastics component, which receptacle is surrounded by a circumferential seal which is inserted into a groove configured in the tool, by way of which a longer lifespan of the seal may be achieved.

This and other objects are achieved according to the invention by a tool for producing fiber-reinforced plastics components in the injection process, having a receptacle for a plastics component, which receptacle is surrounded by a circumferential seal inserted into a groove configured in the tool, in that a receptacle chamber is provided for volume compensation.

As a consequence of the design embodiment according to the invention, injection material may flow into the receptacle space without deforming and damaging the seal. This increases the lifespan of the inserted seal and, on account thereof, reduces the investment in fitting such that the availability of the tool may be increased.

According to one advantageous development, the receptacle chamber is delimited on the one side by the tool and on the other side by the seal.

If and when the tool advantageously has an upper tool part and a lower tool part, the receptacle space is advantageously delimited by the upper tool part, the lower tool part, and the seal.

According to one embodiment, the receptacle chamber on the tool side is preferably curved in a domed manner.

According to a preferred development, the seal on the side facing the receptacle chamber has a deformable wall which, in the case of an opened tool, is substantially planar and, in the case of a closed tool, is curved in a domed manner toward the receptacle chamber such that the receptacle chamber assumes a substantially lunate or crescent shape.

The seal on the wall facing the receptacle chamber advantageously has a coating of PTFE (polytetrafluoroethylene), or a similar coating. This enables simple removal of injection material which has penetrated the receptacle space.

According to one preferred development, the seal has a circular portion which is adjoined by a portion which has two parallel walls and which, on the one side, transforms into a comparatively long convex portion terminating at the wall, and on the other side transforms into a comparatively short portion which perpendicularly protrudes from the portion having the parallel walls and which is adjoined by a concave region which is opposite the wall. The concave region and the wall on the side which is opposite the circular portion are interconnected by a region which is formed by two portions of unequal length which are outwardly domed in a curved manner.

The two portions which are outwardly domed in a curved manner are preferably interconnected by a relatively short portion which is inwardly domed in a curved manner and which is opposite the center of the circular portion.

According to one advantageous embodiment, the circular portion on the side which is opposite the portion having the parallel walls has a V-shaped clearance which extends beyond the center of the circular portion.

The seal preferably is composed of EPDM (ethylene propylene diene monomer rubber), silicone, or a similar material.

According to one alternative embodiment, the seal may also be configured as a round or oval rod.

The rod may advantageously have a core from a first material, and a jacket from a second material, which surrounds the core.

According to one preferred embodiment, the jacket may be composed of PTFE or PFA (perfluoroalkoxy alkene polymer), and the core may be composed of an elastomer, such as silicone or EPDM.

The diameter of the core preferably corresponds to about half the diameter of the rod.

According to one advantageous development, the lower tool part on the side of the seal facing away from the receptacle has a plunging edge which, in the case of a closed tool, projects beyond the lower edge of the upper tool part.

Furthermore, according to an advantageous embodiment, a chamfer is provided at the transition from the lower tool part to the groove, on account of which inserting the seal into the groove is simplified.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
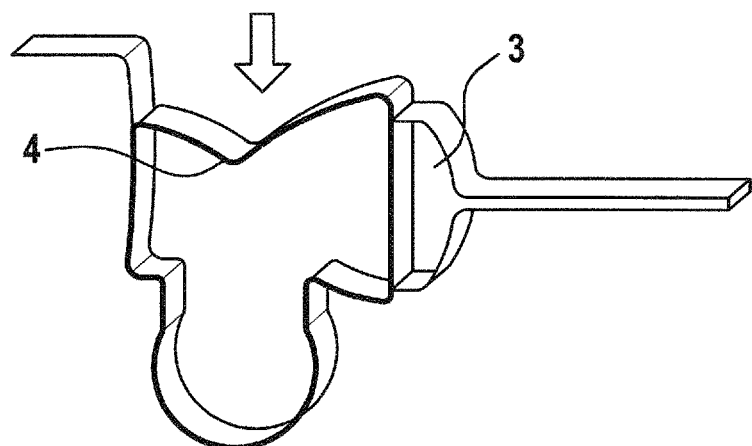
FIGS. 1A-1D show a first embodiment of the invention.
Figure 1B:
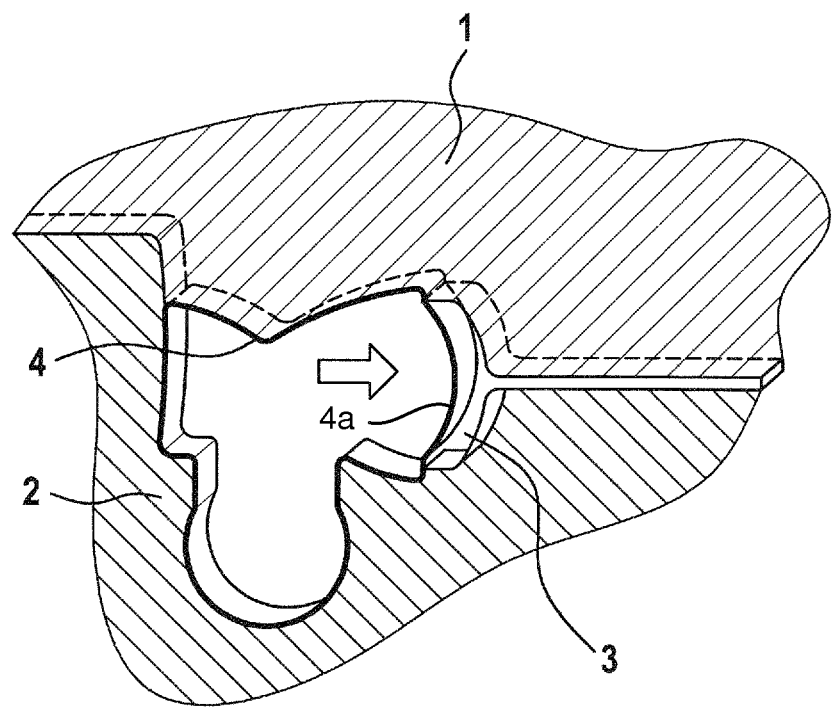

A first embodiment of the invention is illustrated in FIGS. 1A-1D. The tool for producing fiber-reinforced plastics components in the injection process in the following is shown only in the region which is presently of interest.

The tool has an upper tool part 1 and a lower tool part 2. A receptacle chamber 3, which serves as volume compensation, is delimited by the upper tool part 1, the lower tool part 2 and a seal 4.

The receptacle chamber 3 on the tool side is curved in a domed manner. Furthermore, the seal 4, on the side facing the receptacle chamber 3, has a deformable wall 4a which, in the case of an opened tool, may be substantially planar and, in the case of a closed tool, is curved in a domed manner toward the receptacle chamber 3 such that the receptacle chamber 3 assumes a substantially crescent or lunate shape (cf. FIG. 1B).

A coating of PTFE, or a similar material, is provided on a side of the wall 4a of the seal 4 that faces the receptacle chamber 3.

Figure 2:
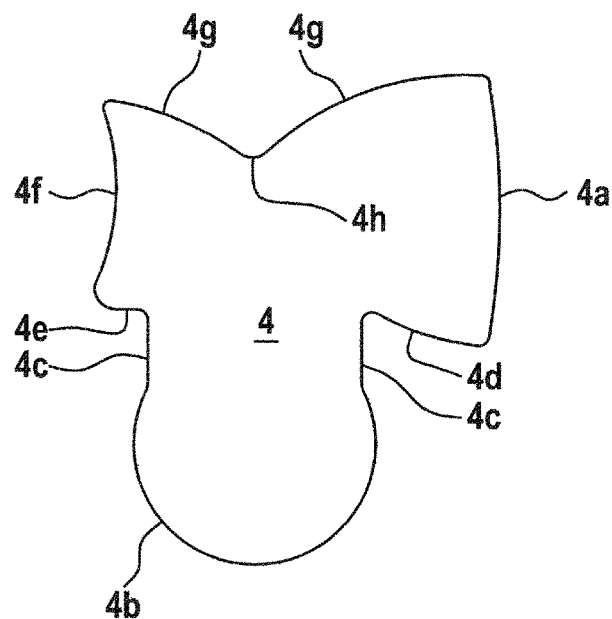
FIG. 2 schematically illustrates a seal which is used in the first embodiment.

The seal 4 has a shape which is illustrated in detail in FIG. 2. The seal 4 has a circular portion 4b which is adjoined by a portion having two parallel walls 4c. The portion having the two parallel walls 4c on the one side transforms into a comparatively long convex portion 4d terminating at the wall 4a, and on the other side transforms into a comparatively short portion 4e which perpendicularly extends from the portion having the parallel walls 4c. The portion 4e is adjoined by a concave region 4f which is opposite the wall 4a. The concave region 4f and the wall 4a on the side which is opposite the circular portion 4b are interconnected by a region formed by two portions 4g of unequal length which are outwardly curved in a domed manner.

The two portions 4g, which are outwardly curved in a domed manner are interconnected by a relatively short portion 4h, which is inwardly curved in a domed manner and which is opposite the center of the circular portion 4b.

Figure 3:
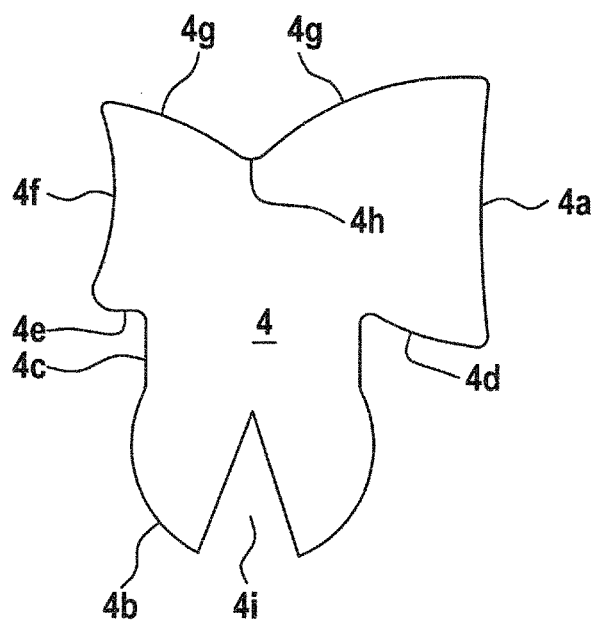
FIG. 3 schematically illustrates a variant of the seal used in the first embodiment.

According to one variant which is illustrated in FIG. 3, the circular portion 4b, on the side which is opposite the portion having the parallel walls 4c, may have a V-shaped clearance 4i which extends beyond the center of the circular portion 4b (cf. FIG. 3).

The seal 4 may be composed of EPDM, silicone, or a similar material.

The functional principle of the design embodiment according to the invention will be explained by way of FIGS. 1A-1D.

The tool is closed in FIG. 1A. During closing, pressure is generated on the portion 4g of the seal, on account of which the wall 4a is deformed in the direction of the tool and, in the closed state of the tool, forms a convex shaping (cf. FIG. 1B). The lunate or crescent-shaped receptacle chamber 3 which serves as volume compensation for the injection material is now configured between the now convex wall 4a of the seal 4, on the one hand, and the upper tool part 1 and the lower tool part 2, on the other hand.

Figure 1C:
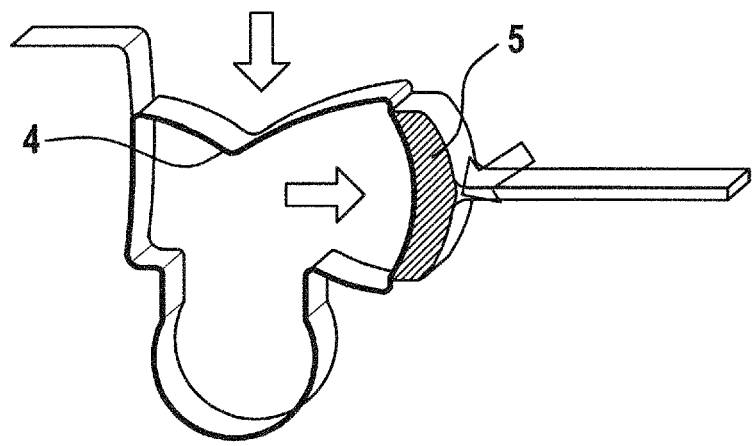
Figure 1D:
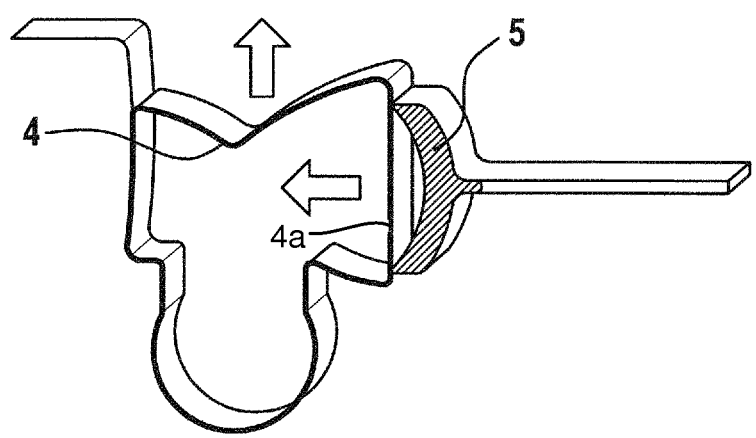

If injection material 5 now makes its way into the receptacle chamber 3, the material 5 is received between the convex wall 4a, the upper tool part 1, and the lower tool part 2, without deforming the seal 4 (cf. FIG. 1C).

Once the tool is opened again after curing in the injection process, the portion 4g, on account of the pressure being released, moves upward again into its initial position. As a consequence, the wall 4a also returns into its initial position and hereby releases itself from the injection material 5, such that the latter may now be readily removed (cf. FIG. 1D).

Figure 4:
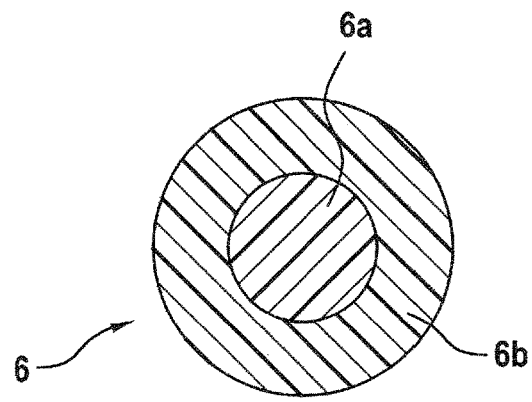
FIG. 4 schematically illustrates a second embodiment of the seal.

An alternative embodiment of a seal 6 is illustrated in FIG. 4. This seal 6 is configured as a round or oval rod which has a core 6a from a first material, and a jacket 6b from a second material. The jacket 6b surrounds the core 6a.

The jacket 6b may be composed of PTFE or PFA, for example, and the core 6a may be composed of an elastomer, such as silicone or EPDM. The diameter of the core 6a preferably corresponds to about half the diameter of the rod.

Figure 5:
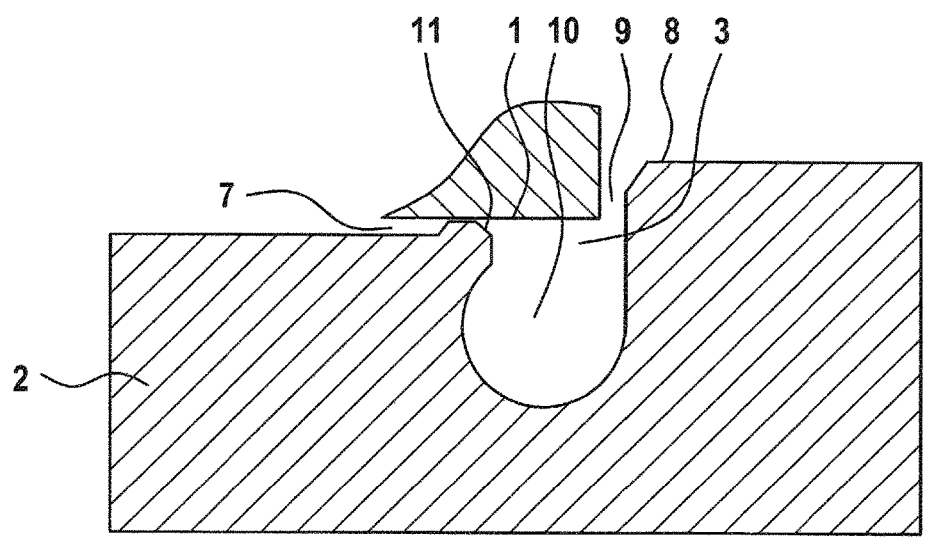
FIG. 5 is a sectional view illustrating a lower tool part used in the context of the second seal.

A tool which is used in the context of the seal 6 according to FIG. 4 is illustrated in FIG. 5.

The lower tool part 2 on the side of the seal 6 facing away from the receptacle 7 for the tool has a plunging edge 8 which, in the case of a closed tool, projects beyond the lower edge of the upper tool part 1. A gap 9 is configured between the plunging edge 8 and the upper tool part 1. The plunging edge 8 prevents the seal 6 being sheared away on account of the high pressure during injection. The plunging-edge gap may also be used as volume compensation for the seal 6.

Furthermore, a chamfer 11 for facilitating fitting of the seal 6 is provided at the transition from the lower tool part 2 to the groove 10 which receives the seal 6.

In this embodiment, the receptacle chamber 3 is likewise configured between the upper tool part 1, the lower tool part 2, and the seal 6.

LIST OF REFERENCE SIGNS

1 Upper tool part
2 Lower tool part
3 Receptacle chamber
4 Seal
4a Deformable wall
4b Circular portion
4c Portion having parallel walls
4d Portion
4e Portion
4f Concave region
4g Portion
4h Portion
4i Clearance
5 Injection material
6a Core
6b Jacket
7 Receptacle
8 Plunging edge
9 Gap
10 Groove
11 Chamfer The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tool for producing fiber-reinforced plastic components in an injection process, the tool comprising:
    a receptacle for a plastics component to be produced; and
    a circumferential seal surrounding the receptacle, the seal having a circular portion adjoined by a non-circular portion, wherein
    the seal is inserted into a groove formed in the tool, and a receptacle chamber fluidly coupled with the receptacle is configured to provide volume compensation for injection material injected into the receptacle.

2. The tool according to claim 1, wherein the receptacle chamber is delimited on one side by the tool and on another side by the seal.

3. The tool according to claim 2, wherein
the tool comprises an upper tool part and a lower tool part, and
the receptacle chamber is delimited by the upper tool part, the lower tool part, and the seal.

4. The tool according to claim 1, wherein
the tool comprises an upper tool part and a lower tool part, and
the receptacle chamber is delimited by the upper tool part, the lower tool part, and the seal.

5. A tool for producing fiber-reinforced plastic components in an injection process, the tool comprising:
a receptacle for a plastics component to be produced; and
a circumferential seal surrounding the receptacle, wherein the seal is inserted into a groove formed in the tool,
a receptacle chamber fluidly coupled with the receptacle is configured to provide volume compensation for injection material injected into the receptacle, and
the receptacle chamber is configured to be curved in a domed manner on a tool side of the receptacle chamber.

6. The tool according to claim 3, wherein the receptacle chamber is configured to be curved in a domed manner on a tool side of the receptacle chamber.

7. The tool according to claim 1, wherein
a wall of the seal on a side facing the receptacle chamber is deformable,
in a case of an opened tool, the wall is substantially planar, and
in a case of a closed tool, the wall is curved in a domed manner toward the receptacle chamber, whereby the receptacle chamber has a substantially lunate or crescent shape.

8. The tool according to claim 6, wherein
a wall of the seal on a side facing the receptacle chamber is deformable,
in a case of an opened tool, the wall is substantially planar, and
in a case of a closed tool, the wall is curved in a domed manner toward the receptacle chamber, whereby the receptacle chamber has a substantially lunate or crescent shape.

9. The tool according to claim 1, further comprising a PTFE coating on a wall of the seal facing the receptacle chamber.

10. The tool according to claim 8, further comprising a PTFE coating on a wall of the seal facing the receptacle chamber.

11. A tool for producing fiber-reinforced plastic components in an injection process, the tool comprising:
a receptacle for a plastics component to be produced; and
a circumferential seal surrounding the receptacle,
wherein the seal is inserted into a groove formed in the tool, and
a receptacle chamber is configured to provide volume compensation,
wherein a wall of the seal on a side facing the receptacle chamber is deformable,
in a case of an opened tool, the wall is substantially planar, and
in a case of a closed tool, the wall is curved in a domed manner toward the receptacle chamber, whereby the receptacle chamber has a substantially lunate or crescent shape, and
wherein the seal is configured to have:
the deformable wall that faces the receptacle chamber,
a circular portion, and
a portion having two parallel walls, a first of the two parallel walls adjoining one end of the circular portion on one side and transforming into a comparatively long convex portion that terminates at the deformable wall on the other side, a second of the two parallel walls adjoining another end of the circular portion on one side and, on the other side, transforming into a comparatively short portion that extends perpendicularly from the second parallel wall and which is adjoined by a concave region that is opposite the deformable wall,
the concave region and the deformable wall being interconnected at ends opposite the circular portion by a region formed of two unequal length portions that are outwardly curved in a domed manner.

12. The tool according to claim 11, wherein the two unequal length portions are themselves interconnected by a relatively short portion that is curved inwardly in a domed manner and that is opposite a center of the circular portion.

13. The tool according to claim 12, wherein on a side opposite the portion having the two parallel walls, the circular portion has a V-shaped clearance, a pointed end of the V-shaped clearance extending beyond a center of the circular portion.

14. The tool according to claim 11, wherein on a side opposite the portion having the two parallel walls, the circular portion has a V-shaped clearance, a pointed end of the V-shaped clearance extending beyond a center of the circular portion.

15. The tool according to claim 1, wherein the seal is made of EPDM or silicone.

16. A tool for producing fiber-reinforced plastic components in an injection process, the tool comprising:
a receptacle for a plastics component to be produced; and
a circumferential seal surrounding the receptacle,
wherein the seal is inserted into a groove formed in the tool, and
a receptacle chamber is configured to provide volume compensation,
wherein the seal is configured as a round or oval shaped rod,
wherein the tool comprises a lower tool part and an upper tool part,
wherein the lower tool part has a plunging edge on a side of the seal that faces away from the receptacle,
wherein in a case of a closed tool, the plunging edge projects beyond a lower edge of the upper tool part, and
wherein the tool further has a chamfer provided at a transition of the lower tool part to the groove.

17. The tool according to claim 16, wherein the rod comprises a core formed of a first material and a surrounding jacket formed of a second material.

18. The tool according to claim 17, wherein the jacket is formed of PTFE or PFA, and the core is formed of an elastomer.

19. The tool according to claim 17, wherein the core has a diameter approximately half that of the rod.

* * * * *